Figure 1:
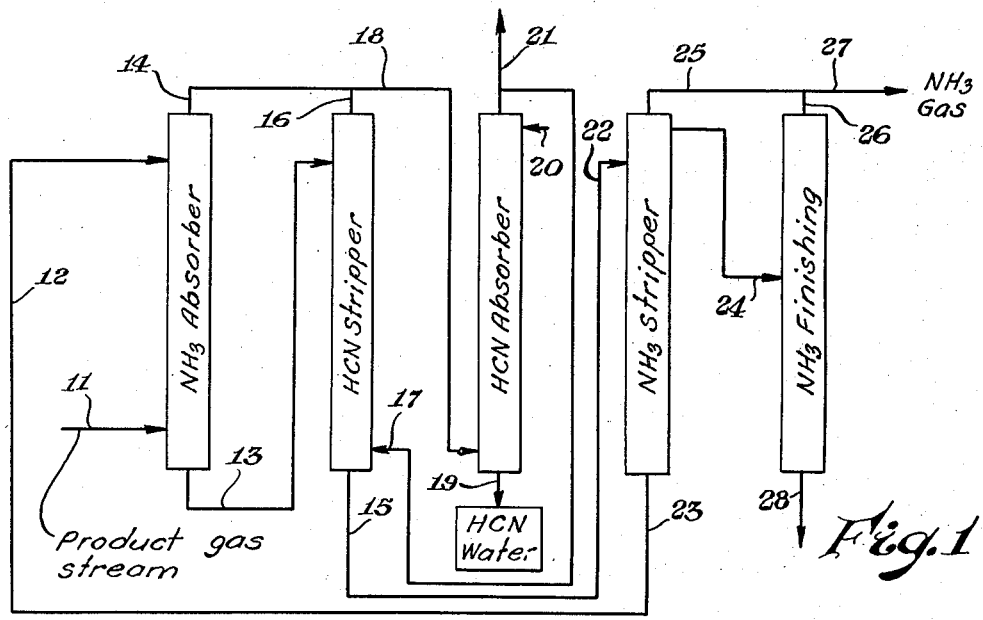

United States Patent Office 2,899,274
Patented Aug. 11, 1959

2,899,274

RECOVERY OF AMMONIA AND HYDROGEN CYANIDE FROM GASEOUS MIXTURES

Raymond A. Smith and Holmes H. McClure, Lake Jackson, and George C. Bond, Freeport, Tex., assignors to The Dow Chemical Company, Midland, Mich., a corporation of Delaware Application December 31, 1956, Serial No. 631,579

8 Claims. (Cl. 23—151)

This invention relates to a process for removing ammonia and hydrogen cyanide from a gas stream containing the same, and separately recovering these two compounds.

Gas streams containing ammonia and hydrogen cyanide may be derived from a variety of sources, but the most frequent commercial occurrence of the combination of these two gases occurs in product gas from the pyrolysis of ammonia and a hydrocarbon to produce hydrogen cyanide. One of the more usual methods employed is to pass a mixture of methane, ammonia and air over a platinum catalyst at approximately 1000° C. The product gas generally contains from two to four percent ammonia, four to eight percent hydrogen cyanide and the balance inerts such as hydrogen, methane, carbon monoxide, carbon dioxide, oxygen and nitrogen, with some water vapor.

The removal of either hydrogen cyanide or ammonia from product gases presents no problem and has been done successfully for some time. It is the combination of these two compounds which gives rise to critical conditions which have not heretofore been satisfactorily met. Hydrogen cyanide self-polymerizes in the presence of even very small amounts of ammonia, so that a common solvent cannot be employed. This polymer deposits on the walls of the apparatus, plugs pipes and ultimately causes a shut-down while the apparatus is being cleaned. Also, the hydrogen cyanide polymer product decreases the amount of HCN recovered as the end product.

Several procedures are known in the prior art for effecting substantial separation of such gases as HCN and ammonia, but none of these disclose a procedure for effecting total separation of these compounds. This is a critical point in view of the polymerization of HCN in the presence of ammonia, as above pointed out, and no process which does not effect total separation can offer a practical commercial solution to this problem. Sulfuric acid solutions have been used to tie-up the ammonia in the form of ammonium sulfate, but this creates large amounts of an undesirable by-product where it is particularly desirable that the ammonia be recovered for reuse in producing more HCN. Patent Number 2,590,146 discloses another procedure for tying up the ammonia in a boric acid-polyhydroxy complex. Upon heating a water solution of this complex to remove the HCN, however, some ammonia also is released. Furthermore, all of the HCN cannot be stripped before the complex breaks up thus releasing the ammonia. Consequently, the polymerization product is found both in the HCN separation equipment as well as in that portion of the apparatus employed to separate and recover the ammonia.

A principal object of the present invention is to provide a process for recovering ammonia and HCN from gases containing the same wherein complete separation of the ammonia from the hydrogen cyanide is effected.

Another object of the present invention is to provide an improved process for separately recovering ammonia and HCN from gases containing the same wherein the polymerization of HCN in the presence of ammonia is eliminated and complete separation of these two compounds is effected.

Figure 2:
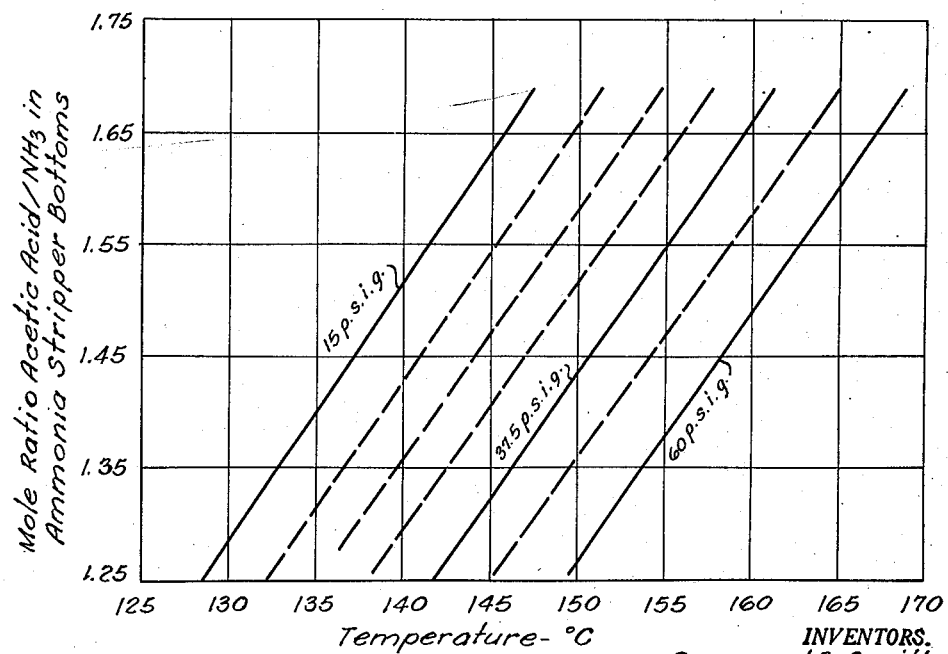

Other objects and advantages of the present invention will become apparent from the following detailed description thereof, when read in conjunction with the accompanying drawings wherein:

Figure 1 is a flow sheet illustrating one embodiment of the present invention, and Figure 2 is a graph depicting the inter-relationship between pressure, temperature and the ratio of acid to ammonia.

It has been found that by contacting a gaseous mixture comprising both ammonia and HCN with an acidic solution containing essentially a saturated fatty acid containing from two to three carbon atoms, water and the ammonium salt of said fatty acid, all of the ammonia can be removed from the gaseous mixture and is retained in the acidic solution in the form of the fatty acid salt. Furthermore, the HCN simultaneously absorbed by the acidic solution can be completely removed before the ammonium salt is cracked to release the ammonia, and the ammonia is thus recovered free from HCN.

The present invention is generally applicable to gaseous mixtures containing both hydrogen cyanide and ammonia, but the primary commercial application is directed to the removal of ammonia and HCN from "producer gas" or "product gas," which terms as used in this specification and attached claims refer to that gas which is obtained in the pyrolysis of ammonia and a hydrocarbon for the production of hydrogen cyanide. A typical analysis of this product gas is 6 percent HCN, 2 percent $NH_3$, 21 percent $H_2O$, 8 percent $H_2$, 4.4 percent CO, 0.3 percent $CO_2$, 0.5 percent $CH_4$, 0.1 percent $O_2$ and 57.7 percent $N_2$.

For purposes of clarity, the present invention will be described in connection with its application to product gas and with particular reference to that embodiment of the invention disclosed in Figure 1 of the drawings. The product gas stream is passed through a pipe 11 into an ammonia absorber. At the same time an acidic solution is introduced through line 12 near the top of the ammonia absorber and passes down by gravity through the packed tower of the absorber and thus intimately contacts the product gas. This acidic solution contains essentially a saturated fatty acid, water and the ammonium salt of fatty acid. When the product gas contacts this acidic solution, the ammonia in the gas reacts with the acid to produce more of the fatty acid ammonium salt. Thus, the ammonia is chemically bound to the acid and is not absorbed in the true sense of the word. The term "absorber" has been applied to this particular piece of apparatus, however, since it is the same type of column that is generally designated the ammonium absorber in the standard recovery system.

The fatty acid used may be selected from the group consisting of acetic acid and propionic acid. Acetic acid is preferred since it is cheaper and more readily available. The respective amounts of the acid, water and ammonium salt are not highly critical. It is essential, however, that the acid be present in an excess such that the pH of the solution is always on the acid side even after contacting the product gas. Thus, the amount of acid employed must be in a stoichiometric excess over that required to react with all of the ammonia in the product gas. The presence of water is required to give adequate volume to the acetic solution and comprises from fifty to ninety-five percent by weight of the solution. The ammonium salt lends stability to the solution and decreases the pH of the solutions that need be handled, and amount present further controls the percentage decomposition of the ammonium salt at a given temperature and pressure. The amount of ammonium salt is preferably such that the molal ratio of acid to ammonia ranges from 1.25 to 1.70. A typical acidic solution may have a composition such as 7 percent acetic acid, 15 percent ammonium acetate and 78 percent water, where a gas containing approximately 2 percent ammonia is treated.

The temperature and pressures employed in the ammonia absorber are not critical but should be carefully controlled for optimum results. The temperature normally ranges from about 50° C. at the top of the column to 100° C. at the bottom of the column. In this manner most of the HCN is vaporized at the bottom of the column and will not pass out through the pipe 13, and the cooler liquid at the top of the column prevents any acid (from the acidic solution) from passing out through line 14. Atmospheric pressure is employed, although higher pressures can be used in the present invention. It is essential only that temperatures and pressures which will crack the ammonium salt be avoided. These conditions would be considered extreme and would not normally be employed in an absorption column.

Most of the product gas that contacts the acidic solution in the ammonia absorber passes upwardly and out through line 14 and consists essentially of inerts and substantially all of the HCN. This gas stream is then directed through line 18 to the HCN absorber wherein water introduced through line 20 percolates down through the tower and absorbs the HCN. The inert gas passes out through line 21 as the water solution of HCN is drawn off at the bottom through line 19. The HCN can then be stripped from this water solution by vaporizing with steam, warmed air or off gas in accordance with procedures well-known in the prior art.

The gas-contacted acidic solution contains all of the ammonia from the product gas in the chemically combined form of the ammonium salt and a small amount (less than 5 percent of the total) of the HCN dissolved in the aqueous solution. This acidic solution is removed from the ammonia absorber through line 13 and passed into the top of the HCN stripper. Off gas bled from line 21 is passed through line 17 into the bottom of the hydrocyanic stripper and upwardly through the column to remove the last traces of HCN from the acidic solution. The HCN-containing gas passes upwardly and out through line 16 and into line 18 where it too is fed to the HCN absorber. The stripped acidic solution is removed from the bottom of the hydrocyanic stripper through line 15 and introduced into an ammonia stripper through line 22.

The feed which enters the ammonia stripper through line 22 has a lower molal ratio of acid to ammonium salt than is present in the acidic solution fed through line 12 to the ammonium absorber. This follows since the acid in the acidic solution reacts with the ammonia in the product gas in passing through the ammonia absorber, thus reducing the amount of acid and increasing the amount of ammonium salt. The ammonia stripper performs two primary functions. First, the acidic solution is distilled under pressures and temperatures such that at least a portion of the ammonium salt in solution is cracked to the acid and free ammonia and the free ammonia gas is stripped off the top of the stripper through line 25 and eventually collected through line 27. Secondly, the acidic solution which is recovered at the bottom of the ammonia stripper has approximately the same composition as that of the original acidic solution passed into the ammonia absorber through line 12. Consequently, the bottoms from the ammonia stripper can then be passed through line 23 up through line 12 and into the ammonia absorber to provide a continuous cyclical operation for separating ammonia and HCN from product gas.

In the operation of the ammonia stripper, it is extremely important that the acid concentration in the bottoms be carefully controlled. As above pointed out, the acid concentration in the acidic solution is critical to the extent that the acid must be in stoichiometric excess of that required to react with all of the ammonia in the product gas and thus maintain the solution acidic at all times. In this manner polymerization of the hydrogen cyanide in the presence of ammonia can be avoided. If too much acid is employed difficulty is encountered in the ammonia stripper in separating the acid from the ammonia gas.

Although it must occasionally be adjusted to meet changes in $NH_3$ content of the product gas, the acid concentration of the acidic solution is preferably maintained at some predetermined constant. To do this, it is necessary only to crack sufficient ammonium salt to remove that ammonia which has been chemically combined with the acidic solution in the ammonia absorber.

In order to describe the operation of the ammonia stripper, reference is made to Figure 2 which discloses the relationship between pressure, temperatures, and the ratio of acid to ammonium salt. The data set forth in Figure 2 were obtained by distilling at various temperatures and pressures an acetic acid-ammonium acetate aqueous solution wherein the acid to ammonia ratio was 1.06. This ratio was picked at random and subsequent tests have shown that similar results will be obtained regardless of the original ratio of acid to ammonia. Reference to acid/ammonia ratios as made herein define the molal ratio between the total amount of acid present (including free acid and that combined with ammonia to produce the salt) and the total ammonia present as ammonium acetate.

In Figure 2 the solid lines for pressures of 15, 37.5 and 60 p.s.i.g. represent plotted data, whereas the dotted lines for pressures of 20, 25, 30 and 50 p.s.i.g. have been interpolated. It is evident from Figure 2 that at any given pressure, an increase in temperature will increase the acid/ammonia ratio. To state this another way, an increase in temperature at any given pressure increases the amount of cracking of ammonium acetate or the amount of ammonia given off. It will be noted that as the pressure increases at any given temperature the ratio of acid to ammonia decreases. Thus maximum cracking of the ammonium salt is obtained at low pressures and high temperatures, and minimum cracking is obtained at low temperatures and high pressures. Temperatures ranging from 110° to 175° C. are operable, although it is evident from Figure 2 that temperatures ranging from 130° to 165° C. are preferred. Pressures ranging from atmospheric to 75 p.s.i.g. can be employed, but a more commercially feasible range, and one wherein enhanced results can be obtained, is 15 p.s.i.g. to 60 p.s.i.g. Throughout this description of the operation of the ammonia stripper, the temperature described is that of the bottoms in the ammonia stripper. It is thus apparent from Figure 2 that, knowing the pressure and the temperature of the bottoms in the ammonia stripper, one can readily calculate the approximate ratio of acid to ammonia. Thus, the temperature and the pressure can be so regulated that any desired molal ratio of acid to ammonia can be obtained and uniformity of the acid/ammonia concentration in the acidic solution that is fed through line 12 into the ammonia absorber can be easily regulated.

As above noted, the concentration of the acid is normally constant throughout the distillation in the ammonia stripper so that no make-up acid or dilution is required. However, control of the acid concentration may be effected in any one of several ways which will be apparent to those skilled in the art. For example, make-up water can be added to lower the acid concentration, or the rate at which the distillate is taken off can be increased so that some acid will distill over. Likewise, the acid concentration can be increased by the straight addition of concentrated acid.

As has been set forth above, the bottoms of the ammonia stripper are removed through line 23 and directed into the feed line 12 and then into the ammonia absorber for use again in separating ammonia from the product gas. The ammonia gas is taken overhead in the ammonia stripper out through line 25 and subsequently through line 27 where it is collected. A certain portion of the distillate is removed through line 24 and introduced into an ammonia finishing column. The ammonia gas is stripped off and is taken out through line 26 from the top of the ammonia finishing column, where it is combined with the ammonia gas obtained from the ammonia stripper. Water is removed from the bottom of the ammonia finishing column through line 28 and passed to the sewer.

It is apparent from the above detailed description that the present invention comprises a new and improved process wherein product gas containing both HCN and $NH_3$ is contacted with an acidic solution as above described, to remove all of the ammonia from the product gas by chemical combination with the acidic solution. The HCN which is not absorbed, as well as that which is absorbed and subsequently stripped from the acidic solution, is recovered in the normal manner. Ammonia is stripped from the acidic solution by cracking under predetermined conditions of temperature and pressure and the recovered acidic solution is then recycled for additional contact with the product gas. By practicing the present process the acidic solution removed all of the ammonia from the product gas so that the HCN can be recovered free from any polymerization products. Also, the ammonia is held in chemical combination in the acidic solution so that the small amount of HCN absorbed in the acidic solution can be completely stripped therefrom before any ammonia is cracked off from the ammonia salt. Thus the ammonia can be recovered free from any polymerization products of hydrogen cyanide. These factors permit operation of the present recovery system without requiring down time to unplug lines filled with HCN polymers. Furthermore, higher recovery of HCN follows inevitably.

While the above detailed description of the invention defines a process wherein only a minor amount of HCN is absorbed in the acidic solution, the process may be so modified as to absorb almost 100 percent of the HCN in the acidic solution. When this alternative method is used, it is highly critical that all of the HCN be stripped therefrom before the ammonium salt cracks. This is entirely feasible with the process comprising the present invention. Furthermore, additional pressure (which must be avoided where HCN is in the presence of a polymerization catalyst) can be applied to the $NH_3$ absorber since no free ammonia is present.

Other objects and advantages of the present invention will become apparent to those skilled in the art from the above detailed description thereof.

We claim:

1. In a process for separating and recovering ammonia and HCN from a gaseous mixture containing the same, the steps which comprise contacting a stream of said gaseous mixture with an acidic solution containing essentially a saturated fatty acid containing from two to three carbon atoms, water and the ammonium salt of said fatty acid, the amount of said acid being in stoichiometric excess based on the ammonia in the gas stream, stripping all of the HCN from the acidic solution under conditions which will not crack the ammonium salt of said acid, such conditions comprising a temperature not exceeding about 100° C. and a pressure at least equal to about atmospheric pressure, and subjecting the acidic solution to such conditions of temperature and pressure as will crack the ammonium salt and thus recover the ammonia therefrom.

2. In a process for separating and recovering ammonia and HCN from a gaseous mixture containing the same, the steps which comprise contacting a stream of said gaseous mixture with an acidic solution containing essentially ammonium acetate, water and a stoichiometric excess of acetic acid based on the ammonia in the gas stream, the temperature of the solution being below the atmospheric boiling point thereof, stripping all of the HCN from the acidic solution under conditions which will not crack ammonium acetate, such conditions comprising a temperature not exceeding about 100° C. and a pressure at least equal to about atmospheric pressure, and subjecting the acidic solution to such conditions of temperature and pressure as will crack the ammonium acetate and thus recover the ammonia therefrom which was removed from said gaseous mixture.

3. In a process for removing ammonia and HCN from product gas obtained in the production of HCN from the pyrolysis of ammonia and a hydrocarbon, separating the ammonia from the HCN and subsequently recovering each of these compounds, the steps which comprise intimately contacting a stream of said product gas with an acidic solution consisting essentially of ammonium acetate, water and acetic acid in excess of the amount required to react with all of the ammonia in said gas stream, the temperature of the solution being so regulated that all of the ammonia and only minor amounts of the HCN are removed from the gas stream, stripping all of the HCN from the acidic solution under conditions which will not crack the ammonium acetate, such conditions comprising a temperature not exceeding about 100° C. and a pressure at least equal to about atmospheric pressure, and subjecting the acidic solution to conditions of temperature and pressure such that at least a portion of the ammonium acetate is cracked to ammonia and acetic acid, and recovering the ammonia therefrom.

4. In a cyclical method for separately recovering ammonia and HCN from product gas obtained in the production of HCN from the pyrolysis of ammonia and a hydrocarbon, the steps which comprise intimately contacting a stream of said product gas with an acidic solution consisting essentially of ammonium acetate, water and a stoichiometric excess of acetic acid based on the ammonia in the gas stream at a temperature such that all of the ammonia and very little of the HCN is removed from the gas stream and contained in the acidic solution, stripping all of the HCN from the acidic solution under conditions that will not crack ammonium acetate, such conditions comprising a temperature not exceeding about 100° C. and a pressure at least equal to about atmospheric pressure, subjecting the stripped acidic solution to conditions of temperature and pressure such that a portion of the ammonium acetate is cracked to ammonia and acetic acid, stripping the ammonia thus produced from the acidic solution, and contacting more product gas with the thus treated acidic solution.

5. In a continuous cyclical process for separately recovering ammonia and HCN from product gas obtained in the pyrolysis of ammonia and a hydrocarbon to produce HCN, the steps which comprise directing a stream of product gas into an absorption unit, also introducing into said absorption unit and in intimate contact with said product gas an acidic solution consisting essentially of ammonium acetate, water, and an excess of acetic acid over that required to react with all of the ammonia in the product gas, removing the gas-contacted acidic solution from the absorption unit, maintaining the temperature in the adsorption unit in the range of 70° to 100° C. and the pressure at one p.s.i.g. so that all of the ammonia and very little of the HCN is removed from the gas stream by absorption in the acidic solution, stripping all of the HCN from the gas-contacted acidic solution under conditions of temperature and pressure that will not crack ammonium acetate, distilling the stripped acidic solution under conditions of temperature and pressure that will crack ammonium acetate to ammonia and acetic acid so that the distilland has the same acetic acid/ammonia ratio as did the acidic solution fed to the absorption unit, stripping off and collecting the ammonia thus produced, and returning the distilland to the absorption unit to complete the cycle.

6. In a cyclical method for separately recovering ammonia and HCN from product gas obtained in the production of HCN from the pyrolysis of ammonia and a hydrocarbon, the steps which comprise intimately contacting a stream of said product gas with an acidic solution containing an acid of the group consisting of acetic and propionic, water and the ammonium salt of said acid, said acid being present in a stoichiometric excess over that required to react with all of the ammonia in the product gas stream, maintaining the temperature of said acidic solution in a range such that all of the ammonia and very little of the HCN is removed from the gas stream and contained in the acidic solution, stripping all of the HCN from the acidic solution under conditions that will not crack the ammonium salt of said fatty acid, such conditions comprising a temperature not exceeding about 100° C. and a pressure at least equal to about atmospheric pressure, subjecting the stripped acidic solution to conditions of pressure and temperature such that a portion of the aforesaid ammonium salt is cracked to ammonia and the respective fatty acid, stripping the ammonia thus produced from the acidic solution, and contacting more product gas with the thus-treated acidic solution.

7. In a cyclical method for separately recovering ammonia and HCN from product gas obtained in the production of HCN from the pyrolysis of ammonia and a hydrocarbon, the steps which comprise intimately contacting a stream of said product gas with an acidic solution consisting essentially of a saturated fatty acid containing from two to three carbon atoms, water, and the ammonium salt of said fatty acid, said fatty acid being present in a stoichiometric excess over that required to react with all of the ammonia in the producer gas stream, maintaining the temperature of said acidic solution in the range from 70° C. to 100° C. and pressure at approximately one p.s.i.g. so that all of the ammonia and very little of the HCN is removed from the gas stream and contained in the acidic solution, stripping all of the HCN from the acidic solution at a temperature not in excess of 80° C. and at a pressure of approximately one p.s.i.g., subjecting the stripped acidic solution to a temperature of at least 125° C. and a pressure between 15 to 45 p.s.i.g. so that a portion of the aforesaid ammonium salt is cracked to ammonia and the respective fatty acid, stripping the ammonia thus produced from the acidic solution, and contacting more product gas with the thus-treated acidic solution.

8. In a continuous cyclical method for separately recovering ammonia and HCN from product gas obtained in the production of HCN from the pyrolysis of ammonia and a hydrocarbon, the steps which comprise intimately contacting a stream of said product gas with an acidic solution consisting essentially of ammonium acetate, water, and a stoichiometric excess of acetic acid based on the ammonia in the gas stream at a temperature such that all of the ammonia and very little of the HCN is removed from the gas stream by absorption in the acidic solution, stripping all of the HCN from the acidic solution under conditions that will not crack ammonium acetate, distilling the stripped acidic solution under conditions of temperature and pressure such that sufficient amount of the ammonium acetate is cracked to ammonia and acetic acid that the distilland has the same ratio of acetic acid to ammonia as the acidic solution used to contact the product gas, stripping and collecting the ammonia thus obtained from the distilland, and re-using the distilland to contact more product gas and thus complete the cycle.

References Cited in the file of this patent
UNITED STATES PATENTS

| | | |
|---|---|---|
| 2,283,977 | Dreyfus et al. | May 26, 1942 |
| 2,590,146 | Barsky | Mar. 25, 1952 |
| 2,706,675 | Chatelain | Apr. 19, 1955 |